(12) United States Patent
Snyder

(10) Patent No.: US 6,370,635 B2
(45) Date of Patent: *Apr. 9, 2002

(54) DUAL ROM MICROPROGRAMMABLE MICROCONTROLLER AND UNIVERSAL SERIAL BUS MICROCONTROLLER DEVELOPMENT SYSTEM

(75) Inventor: Warren S. Snyder, Snohomish, WA (US)

(73) Assignee: Cypress Semiconductor Corp., San Jose, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/481,038

(22) Filed: Jan. 11, 2000

Related U.S. Application Data (63) Continuation of application No. 09/189,216, filed on Nov. 10, 1998, now abandoned, which is a continuation of application No. 08/705,807, filed on Aug. 30, 1996, now Pat. No. 5,859,993.

(51) Int. Cl.[7] .................................................. G06F 9/30
(52) U.S. Cl. ........................................................ 712/32
(58) Field of Search ................................ 712/208, 239, 712/32

(56) References Cited

U.S. PATENT DOCUMENTS

| | | | |
|---|---|---|---|
| 3,789,360 A | * 1/1974 | Clark et al. .................. | 714/792 |
| 3,833,888 A | 9/1974 | Stafford et al. ............. | 395/821 |
| 4,038,533 A | 7/1977 | Dummermuth et al. ...... | 364/136 |
| 4,042,972 A | 8/1977 | Gruner et al. ............... | 395/389 |
| 4,466,055 A | 8/1984 | Kinoshita et al. ........... | 395/308 |
| 4,511,968 A | 4/1985 | Fenesik et al. ........... | 340/825.5 |
| 5,675,813 A | 10/1997 | Holmdahl .................. | 395/750 |
| 5,845,151 A | * 12/1998 | Story et al. .................... | 710/27 |
| 5,896,534 A | * 4/1999 | Pearce et al. .................. | 710/17 |

FOREIGN PATENT DOCUMENTS

| | | |
|---|---|---|
| WO | WO 9736230 | 10/1997 |

OTHER PUBLICATIONS

Universal Serial Bus Specification, Revision 1.0, pp. 1–268, Jan. 15, 1996.
Universal Host Controller Interface (UHCI) Design Guide, Revision 1.1, Intel, pp. 1–41, Mar. 1996.
Warren S. Snyder et al., "Microcontroller Development System and Applications Thereof for Development of a Universal Serial Bus Microcontroller", Serial No. 08/711, 419, Filed Aug. 30, 1996.

* cited by examiner

*Primary Examiner*—David Y. Eng
(74) *Attorney, Agent, or Firm*—Christopher P. Maiorana, P.C.

(57) ABSTRACT

A microprogrammable microprocessor that stores microprogramming instruction sets in a dual ROM configuration enhancing reusability of subroutine operations common between two or more instructions. A first ROM contains a look up table identifying the subroutine(s) utilized by each instruction. The second ROM contains the subroutines needed to implement the required operations for each instruction. The dual ROM microprogrammable microprocessor is used in a Universal Serial Bus microcontroller development system having a microprocessor, control circuit, and an interface to USB bus. The microprocessor system state and I/O registers are mapped to a system bus sharing the same lines with a control circuit. The control circuit provides an RS-232 interface to an attached computing device able to write and read data words to the system bus, thereby to control the microprocessor and associated hardware by setting the system state and writing/reading data from RAM. The control circuit is also attached to a Universal Serial Bus, hence allowing 100% testing of USB compliant devices and firmware. The circuit specs can be programmed in a Hardware Description Language which is then mapped onto a family of programmable circuit devices such as ASICs or FPGAs.

20 Claims, 5 Drawing Sheets

DUAL ROM MICROPROGRAMMABLE MICROCONTROLLER AND UNIVERSAL SERIAL BUS MICROCONTROLLER DEVELOPMENT SYSTEM

This is a continuation of U.S. Ser. No. 09,189,216, filed Nov. 10, 1998, now abandoned, which is a continuation of U.S. Ser. No. 08/705,807, filed Aug. 30, 1996, now U.S. Pat. No. 5,859,993.

BACKGROUND OF THE INVENTION

This invention relates to microprogrammable microprocessors, and more particularly to ROM based microprogrammable microprocessors, and a Universal Serial Bus ("USB") microcontroller development system configured to aid-in the design, debug, and testing of USB compliant devices and firmware using a ROM based microprogrammable microprocessor.

DISCUSSION OF BACKGROUND

Microprocessor instruction sets are well known in the art. The instruction set of a microprocessor consists of a set of instructions recognized by the microprocessor. Each instruction recognized by the microprocessor is defined in an instruction architectural specification which defines the useful function performed by each instruction and a sequence of actions required to be performed by the microprocessor in order to carry out the instruction. Each instruction in the instruction set is encoded to identify the specific sequence of actions defined by the instruction architectural specification for that instruction.

With the definition of an instruction architectural specification and the encoding of each instruction thereby defined, the microprocessor then has the task of identifying and performing the sequence of actions required to carry out each instruction, thereby implementing the instruction set.

Typically, instruction sets are implemented in either ROM or a set of logic gates. The tradeoff between ROM based instruction sets and gate implementations is the speed at which instructions are retrieved versus the flexibility of implementing new or modified instruction sets. Gate based instruction sets are faster than ROM implementations, but ROM based sets are microprogrammable which makes updating an instruction set as simple as changing the values stored in the ROM.

In many implementations of microprocessors, the interpretation of an instruction byte is performed by combinatorial logic to generate several output terms, each of which gate logic/hardware resources such as Arithmetic Logic Units ("ALUs") and register files. The disadvantage to this approach is that any change in hardware resources or instruction encoding will require redesign and relayout of the combinatorial logic.

Figure 4:
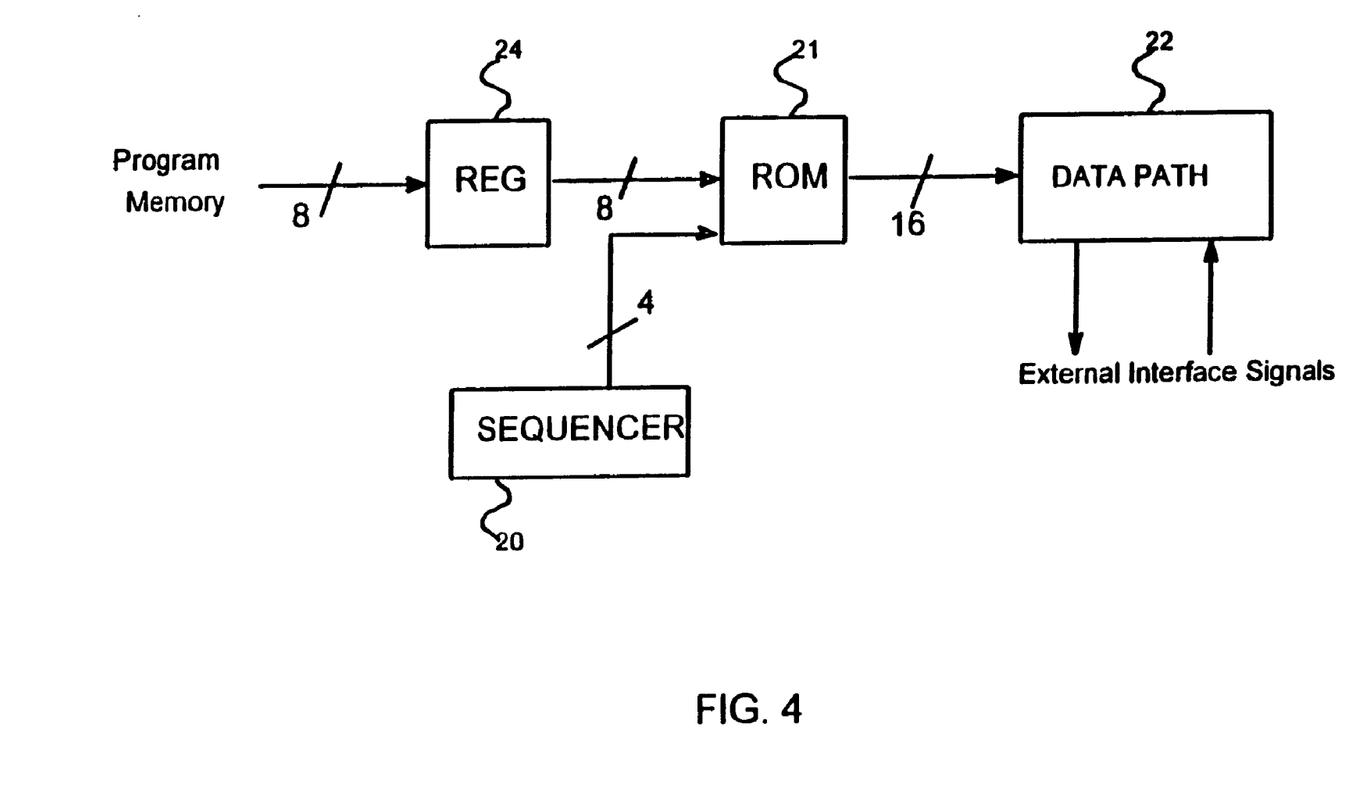
FIG. 4. is a high level prior art drawing of instruction set circuitry for a microprogrammable microprocessor utilizing a single ROM.

FIG. 4 shows a conventional approach to this problem which is to use a read only memory ROM 21 to store the mapping from instruction to decode outputs. For 8 bits of instruction and 15 steps per instruction, mapping requires $2^8$ plus $2^4$ bits of addressing or 4K words, each of which words needs to be as wide as needed to control all the resources. For the microprocessor described herein, this width is 16 bits.

A 4K×16 bit memory can occupy a significant area, and in most technologies this size is larger than the hardware resources it is controlling. This same mapping if synthesized to random gates would be more area efficient, but would suffer from the previously mentioned problem. A method is needed to provide adequate storage for ROM based instructions, but reduce the bit storage requirement for those instructions, thereby making ROM based instruction decoding more size and cost efficient.

Any electronic device utilizing ROM based instruction sets needs to have adequate ROM storage for those instructions. ROM based instruction sets are more size and cost efficient if the amount of ROM storage needed to implement the instruction set can be reduced.

USB is a peripheral bus standard that allows computer peripherals to be attached to a personal computer without the need for specialized cards or other vendor specific hardware attachments. The USB standard specifies a common configuration for the connection of well known peripherals such as CD-ROM, tape and floppy disk drives, scanners, printers, keyboards, joysticks, mice, telephones, modems, etc. In addition to well known peripheral devices, the USB standard has flexibility to accommodate less known and newly developed technologies. Information about the USB standard, including the specification for building USB compliant devices, is currently available free of charge over the Internet.

Developers wishing to implement USB devices must build that device to the USB standard. Prior to fabricating IC's for USB standard devices, a developer will spend a significant amount of resources in testing and refinement of prototypes. An efficient method for testing USB compliant devices is needed to reduce the costs associated with prototype development and testing of those devices.

The design and manufacture of electronic devices such as counters, state machines, specialized registers, and microprocessors is currently aided by technologies that allow engineers to specify design characteristics of a circuit, such as storage device size, register types, connections and associated logic, in a Hardware Description Language ("HDL"). This source code or HDL is then compiled, allowing the electronic device to be simulated and debugged while implementing the specified circuit characteristics. Once the operation of a device is verified, the compiled source code can be mapped to a specific architecture such as Application Specific Integrated Circuits ("ASICs") or Field Programmable Gate Arrays ("IFPGAs"). This allows the system designer to produce a device with design flexibility and portability into various architecture families.

As an example, a 3-bit shift register can be implemented in a HDL such as Register Transfer Language ("RTL") with the following RTL statements:

```
ENTITY shifter3 IS port (
    clk: IN BIT;
    x: IN BIT;
    q0: OUT BIT;
    q1: OUT BIT;
    q2: OUT BIT;
END shifter3;
ARCHITECTURE struct OF shifter3 IS
    SIGNAL q0_temp, q1_temp, q2_temp: BIT;
    BEGIN
        d1: DFF PORT MAP (x,clk,q0_temp);
        d2: DFF PORT MAP (q0_temp,clk,q1_temp);
        d3: DFF PORT MAP (q1_temp,clk,q2_temp);
        q0 <=q0_temp;
        q1 <=q1_temp;
        q2 <=q2_temp;
    END struct;
``` which defines the inputs and outputs of the shifter and then maps those bits to a series of D Flip-Flops. After compiling the source code and debugging the circuit, a netlist can be generated for a specific family of FPGA or ASIC devices to produce the circuit with the desired functionality.

SUMMARY OF THE INVENTION

Accordingly, one object of the present invention is to provide a ROM based microprocessor instruction set implemented in a novel fashion that reduces the required amount of ROM storage needed to implement an instruction set. This is done by providing a microprocessor with an instruction set that is microprogrammable, utilizing 2 ROMs in which the first ROM contains an address look-up table and the second ROM contains re-usable subroutines that perform operations implementing the instruction set. The result is a dual ROM microprogrammable microprocessor that utilizes subroutines in more than one instruction, thereby conserving system resources.

Another object of the present invention is to provide a Universal Serial Bus ("USB") microcontroller development system utilizing a dual ROM microprogrammable microprocessor. The microcontroller includes a dual ROM microprogrammable microprocessor with instruction RAM, a controller with a computer interface (e.g., RS-232) to a personal computer or other external computing device, data RAM, USB logic and registers for interfacing to a USB host computer, and I/O logic and registers for interfacing to an I/O device. The USB microcontroller development system includes the microcontroller, an external computer, a USB host computer, and an I/O device. The USB microcontroller development system allows both the dual ROM micropro- grammable microprocessor or an attached external computer to control the microcontroller. This is accomplished by mapping the USB microcontroller system state which includes the contents of the data RAM, the dual ROM microprogrammable microprocessor's system state registers including system state registers corresponding to the contents of the instruction RAM, the USB logic registers, and the I/O logic registers to a system bus. The controller or dual ROM microprogrammable microprocessor places address, data, and control signals on the system bus which are decoded by various logic to allow reading or writing of the system state. The controller reads or writes the instruction RAM by reading or writing a program counter and an instruction register, included as part of the dual ROM microprogrammable microprocessor's system state registers, via the system bus. Accordingly, the external computer connected to the controller via the RS-232 bus can read or write the USB microcontroller system state to aid in the design, debug, and testing of USB compliant devices and firmware.

It is also an object of the present invention to provide a development access device on the external computer for providing a user a graphical interface for controlling the USB microcontroller. The development access device displaying menus, buttons, text boxes etc., corresponding to the dual ROM microprogrammable microprocessor's system state registers, the contents of the instruction RAM, the USB logic registers, and the I/O logic registers. The user, after selecting the appropriate menu, button, or filling in the appropriate text box, can read or write the corresponding dual ROM microprogrammable microprocessor's system state registers, the contents of the instruction RAM, the USB logic registers, and the I/O logic registers via the external computer and computer interface to control the USB microcontroller.

It is yet another object of the present invention is to provide a method of implementing a dual ROM instruction set in a microprogrammable microprocessor having a first ROM storing a plurality of subroutine starting address sets each set corresponding to a program instruction, a second ROM storing a plurality of subroutines each subroutine containing a series of microprogram instructions, and sequencer logic configured to sequence each subroutine of the plurality of subroutines in accordance with a program instruction.

It is another object of the present invention to provide a method for implementing the above USB microcontroller development system utilizing a Hardware Description Language. By utilizing a Hardware Description Language, the design engineers are free to concentrate on the design of important features of the system and it's functionality rather than a gate level implementation of the system. After determining top level characteristics and functional blocks of the system, an HDL program describing those characteristics and functional blocks is developed and debugged. In the present invention, HDL implemented processes are used in designing various functional blocks of the USB microcontroller development system. The USB microcontroller development system designed using HDL is then mapped to FPGAs and packaged onto a single printed circuit board along with minimal additional logic such as EEPROMs and RAM.

The above and other objects are achieved according to the present invention by providing a new and improved microprogrammable microprocessor having a dual ROM instruction set including a first ROM storing a plurality of microprogram subroutine starting address sets, each set containing at least one subroutine starting address and corresponding to a program instruction; a second ROM storing a plurality of subroutines, each subroutine containing a series of microprogram instructions; and sequencer logic coupled to the first ROM and to the second ROM and configured to initiate the retrieval of subroutine starting addresses from the first ROM and to sequence subroutines in the second ROM corresponding to the subroutine starting addresses retrieved; wherein the second ROM outputs the microprogram instructions to an arithmetic logic unit to carry out the microprogram instructions.

According to a second aspect of the present invention, a microcontroller is provided including a system bus; a microprogrammable microprocessor coupled to the system bus and configured to transfer data and control signals over the system bus and having a dual ROM instruction set including a first ROM storing a plurality of microprogram subroutine starting address sets, each set containing at least one subroutine starting address and corresponding to a program instruction, a second ROM storing a plurality of subroutines, each subroutine containing a series of microprogram instructions, and sequencer logic coupled to the first ROM and to the second ROM and configured to initiate the retrieval of subroutine starting addresses from the first ROM and to sequence subroutines in the second ROM corresponding to the subroutine starting addresses retrieved, wherein the second ROM outputs the microprogram instructions to an arithmetic logic unit to carry out the microprogram instructions; a memory device coupled to the microprogrammable microprocessor and mapped to the system bus and configured to store microprogram instructions for execution by the microprogrammable microprocessor; a controller coupled to the system bus and configured to transfer data and control signals to the microprogrammable microprocessor over the system bus; a host interface coupled to the system bus and configured to interface to a host computer and receive the data and the control signals over the system bus from the microprogrammable microprocessor; and an I/O interface coupled to the system bus and configured to interface to at least one I/O device and receive the data and the control signals over the system bus from the microprogrammable microprocessor.

According to a third aspect of the present invention, a method of implementing a dual RON instruction set in a microprogrammable microprocessor having a first ROM and a second ROM, and includes the steps of (A) storing a plurality of subroutine starting address sets each set corresponding to a program instruction in the first RON, and one or more subroutines each subroutine containing one or more microprogram instructions in the second ROM; (B) retrieving a subroutine starting address set corresponding to a program instruction from the first ROM; and (C) sequencing a series of microprogram instructions in the second RON for each subroutine identified in the subroutine starting address set, thereby executing a program instruction.

According to a fourth aspect of the present invention, a method of fabricating a microprogrammable microprocessor with a dual ROM instruction set includes determining a set of functional requirements for a dual ROM instruction set including a first ROM for storing subroutine starting addresses, a second ROM for containing microprogram subroutines, a sequencer for providing timing and control signals for retrieval of subroutine starting addresses and sequencing of microprogram subroutines; determining a set of functional microprocessor requirements to operate in conjunction with the dual ROM instruction set and specifying a microprogrammable microprocessor with at least two electronic elements; defining the set of functional microprocessor requirements and the functional requirements of the control circuit in a Hardware Description Language (HDL); compiling the HDL language to derive a circuit representation of the microcontroller development system;

and mapping the circuit representation onto one or more devices.

BRIEF DESCRIPTION OF THE DRAWINGS

A more complete appreciation of the invention and many of the attendant advantages thereof will be readily obtained as the same becomes better understood by reference to the following detailed descriptions when considered in connection with the accompanying drawings, wherein.

DESCRIPTION OF THE PREFERRED EMBODIMENTS

Described herein is a design of an 8-bit microprocessor and the techniques used to microprogram it. The techniques have broad application to many types of instruction sets and processors, including those with sizes of 8, 16 and 32 bits.

Based on the premise that ROM is more effective in implementing control structures than random gates when driving data path control signals, and the ability to accurately obtain layout of the control object before an instruction set has been finalized, a two level control store has been implemented, tested, and verified for the microprocessor according to the present invention.

The first level control store maps fetched instructions into starting addresses of subroutines contained in the second level control store. The subroutines contained in the second level control store uniquely define how each instruction is implemented. There are any number of subroutines for any instruction. The number of micro-instructions in each subroutine varies from routine to routine. The superiority of this technique is that only a very small number of different subroutines need actually be coded for a large number of instructions, as there is a high degree of reuse between different instructions.

Referring now to the drawings, wherein like reference numerals designate identical or corresponding parts throughout the several views, a novel method to implement a dual ROM microprocessor having a microprogrammable instruction set is shown.

Figure 1:
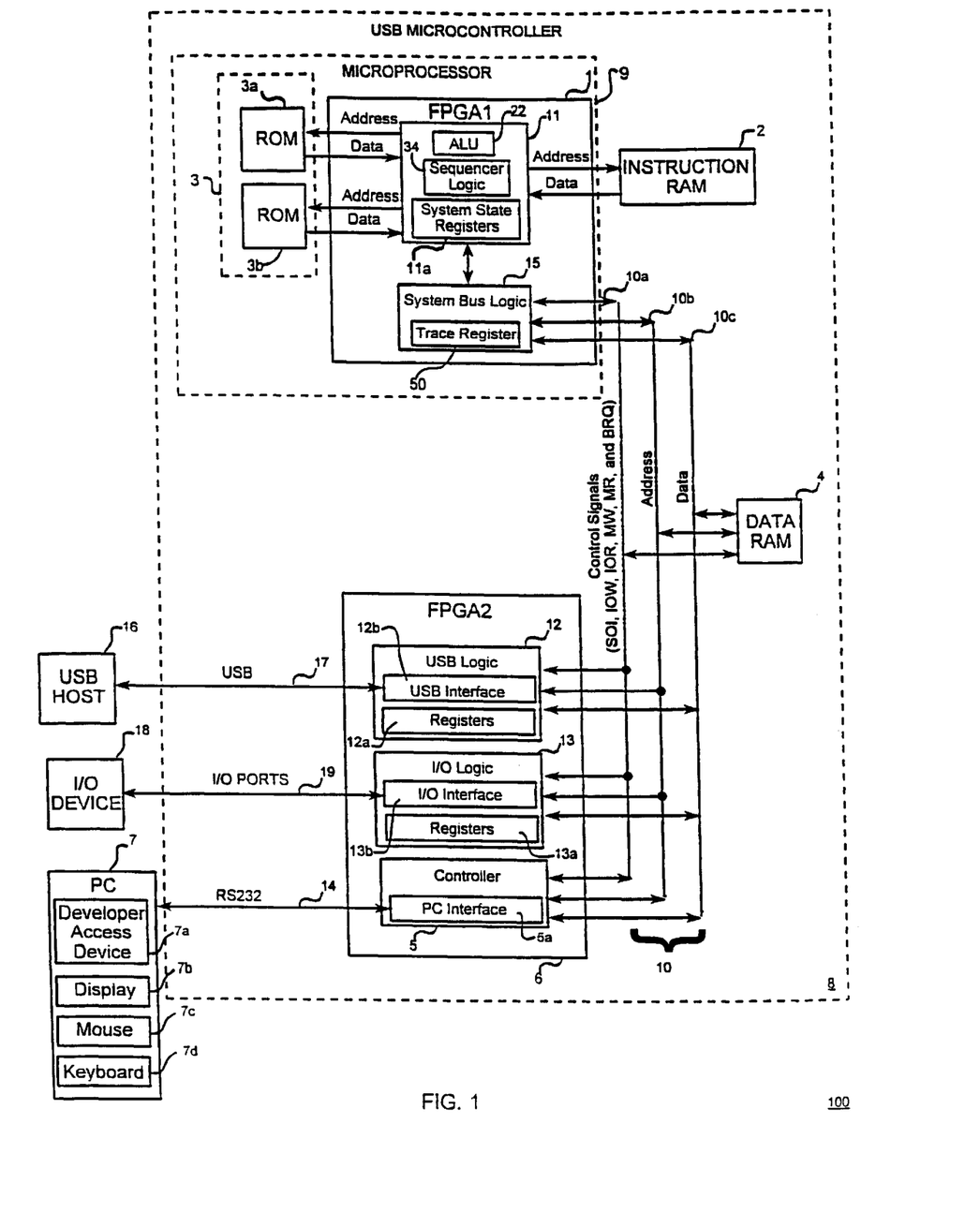
FIG. 1 is a block diagram implementing the USB microcontroller development system according to the present invention.
Figure 5:
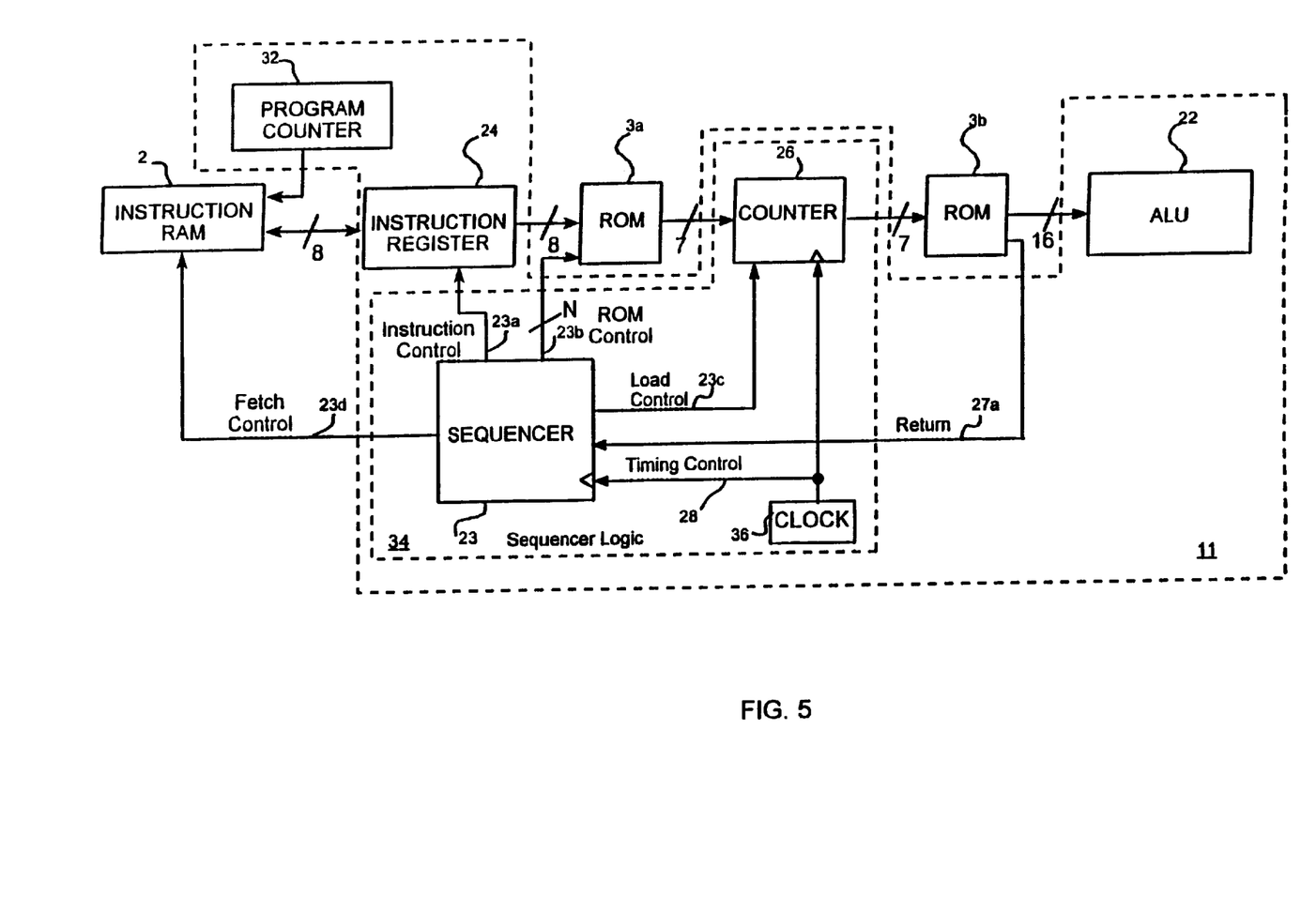
FIG. 5. is a block diagram of the implementation of a dual ROM microprogrammable microprocessor of the present invention.

FIG. 5 shows a block diagram of the implementation of a dual ROM microprogrammable microprocessor 9 in FIG. 1. An instruction identified by an address stored in program counter 32 is fetched from instruction RAM 2 in synchronization with a fetch control 23*d* signal from sequencer 23. The fetched instruction is placed in instruction register 24 in synchronization with instruction control 23*a* signal from sequencer 23. The instruction in register 24 is decoded to provide an address corresponding to the fetched instruction to ROM 3*a*. ROM 3*a* performs a look-up table function by outputting subroutine starting addresses stored in ROM 3*a* that correspond to the fetched instruction. The subroutine starting addresses output by ROM 3*a* are loaded into counter 26 and used to sequence a ROM 3*b*. Microprogram instructions output from sequenced ROM 3*b* are input to and control the resources contained in ALU 22, which includes sufficient internal logic (not shown) to implement the microprogramming operations for each instruction.

Sequencer 23, counter 26, clock 36, and signals instruction control 23*a*, ROM control 23*b*, load control 23*c*, fetch control 23*d*, and timing control 28 together make up sequencer logic 34 that controls the fetching of program instructions from instruction RAM 2, loading of program instructions into the instruction register 24, loading of subroutine starting addresses from ROM 3*b* to counter 26, and the sequencing of ROM 3*b* by counter 26.

Clock 36 provides a timing control 28 signal from which the internal logic (not shown) of counter 26 and sequencer 23 operate.

A subroutine starting address is identified in ROM 3*b* by a combination of the address output by instruction register 24 and ROM control signal 23*b*. ROM 3*b* is sequenced by counter 26, sequencing being initiated by loading a subroutine starting address from ROM 3*a* into counter 26 in synchronization with the load control 23*c* signal of sequencer 23. ROM 3*b* sequences start with the subroutine starting address loaded into counter 26 and continue until the end of the subroutine when ROM 3*b* output signal return 27*a* goes active. This terminates the sequence and tells the sequencer 23 to initiate the next subroutine by loading the next subroutine starting address from the ROM 3*a* into counter 26. This scheme allows instruction sequence lengths to be arbitrarily long up to the size of the secondary ROM 3*b*.

By designing each instruction from one or more of the subroutines contained in ROM 3b, it is possible to share subroutines between instructions and thereby reduce ROM size and reduce the development and testing required for each instruction implemented. Both ROMs 25 and 27 together are smaller than the ROM 21 needed in the previous method shown in FIG. 4.

In a second embodiment of the present invention, the dual ROM microprogrammable microprocessor is used in a USB microcontroller development system 100, which allows 100% testing of USB firmware before the fabrication of final ICs. The USB microcontroller development system 100 is designed using FPGAs, EEPROMs and RAMs, but may be implemented in other electronic configurations including ASICs and/or microprocessor systems having a computing device with appropriately mapped system states and I/O interfaces, as described herein.

The operation of the USB microcontroller development system will be discussed with reference to FIGS. 1–3.

In FIG. 1, FPGA1 1 and EEPROMs 3 implement a dual ROM microprogrammable microprocessor 9. Within the dual ROM microprogrammable microprocessor 9 is provided circuit block 11 including ALU 22, sequencer logic 34, and system state registers 11a. System state registers 11a are mapped to a system bus 10 through system bus logic 15 which includes a trace register 50. Dual ROM microprogrammable microprocessor 9 is connected to instruction RAM 2 which is used to store USB firmware under development.

FPGA2 6 includes USB logic 12 which provide an interface to a USB host computer 16 via USB bus 17 and includes registers 12a; I/O logic 13 which provides an interface to an I/O device 18 via I/O ports 19 and includes registers 13a; and controller 5 which provides a PC interface 5a to the PC 7 (or other external computing device) via RS-232 bus 14. The USB logic 12, the I/O logic 13 and the controller 5 are coupled to the system bus logic 15 of dual ROM microprogrammable microprocessor 9 via the system bus 10. In addition, system bus logic 15 includes trace register 50 which is mapped to the system bus and can be accessed by either the controller 5 or the dual ROM microprogrammable microprocessor 9 to control the execution of firmware running in instruction RAM 2.

As previously discussed, the purpose of the USB microcontroller development system is to aid engineers in the design, debug and development of USB compliant devices and USB firmware. This is accomplished by providing a flexible USB microcontroller development system that allows data gathering and stimulation of the USB microcontroller system state by providing the system state as addressed I/O, provides a computer interface to the USB microcontroller and allows a user to load and control execution of USB firmware, and provides an interface to a USB host computer and USB device under development.

The data gathering and stimulation of the USB microcontroller system state will now be described.

The USB microcontroller system state is determined by providing access to the following registers: System state registers 11a of dual ROM microprogrammable microprocessor 9 including: a program counter 32 (FIG. 5) which holds the address of the instruction RAM 2, an instruction register 24 (FIG. 5) which holds the data corresponding to the program counter 32, stack pointers (not shown) which are addresses into data RAM 4, and temporary registers (not shown) which are used during execution of instructions from instruction RAM 2 by dual ROM microprogrammable microprocessor 9. In addition the USB microcontroller system state includes data memory contents in data RAM 4, USB logic registers 12a, I/O logic registers 13a, and trace register 50 of system bus logic 15.

The above registers are I/O mapped to the system bus 10, so that when an address is placed on the system bus the system bus logic 15, USB logic 12 and I/O logic 13 decode this address to determine which logic block and which register within the logic block is being addressed.

In addition, system bus 10 includes several control signals 10a that are provided by dual ROM microprogrammable microprocessor 9 or controller 5.

From the dual ROM microprogrammable microprocessor 9:

SOI (start of instruction): tells the USB logic 12, I/O logic 13, and controller 5 that a new instruction is about to execute in instruction RAM 2;

IOW (I/O write): tells the USB logic 12, I/O logic 13, and controller 5 that the dual ROM microprogrammable microprocessor 9 wishes to write to system state registers 11a, USB logic registers 12a, I/O logic registers 13a, or trace register 50;

IOR (I/O read): tells the USB logic 12, I/O logic 13, and controller 5 that the dual ROM microprogrammable microprocessor 9 wishes to read system state registers 11a, USB logic registers 12a, I/O logic registers 13a, or trace register 50;

MW (memory write): tells the USB logic 12, I/O logic 13, and controller 5 that the dual ROM microprogrammable microprocessor 9 wishes to write data to data RAM 4;

MR (memory read): tells the USB logic 12, I/O logic 13, and controller 5 that the dual ROM microprogrammable microprocessor 9 wishes to read data from data RAM 4; and From the Controller 5:

Control signals IOW, IOR, MW and MR of control signals 10a are the same as from the dual ROM microprogrammable microprocessor 9, except from the point of view of the controller 5, they share the same physical wire/signal paths but the scope is determined by a master bus request ("BRQ") control signal of control signals 10a. BRQ allows the controller 5 to preempt the dual ROM microprogrammable microprocessor 9 and have the controller 5 control signals replace those of the dual ROM microprogrammable microprocessor 9. The value/states of the controller 5 control signals 10a are generated from a finite state machine (not shown) in controller 5 that also communicates with the PC 7 using an RS-232 serial data protocol. In this way controller 5 can take over control of the system from dual ROM microprogrammable microprocessor 9 and read and write the contents of the system state.

The computer interface and execution control and loading of USB firmware will now be described.

In FIG. 1, PC 7 includes developer access device 7a which is a graphical user interface ("GUI") or other software running on PC 7 for displaying menus, buttons, text boxes etc. (not shown) on display 7b corresponding system state registers 11a, trace register 50, USB logic registers 12a, and I/O registers 13a and for commanding PC 7 to transfer appropriate commands over the RS-232 bus 14 to PC interface 5a of controller 5. Thus, the user, after selecting the appropriate menu, button, or filling in the appropriate text box with mouse 7c and keyboard 7d, can read or write the corresponding system state registers 11a, trace register 50, USB logic registers 12a, and I/O registers 13a via PC 7, RS-232 bus 14 and PC interface 5a to control the USB microcontroller 8.

On command from developer access device 7a, as previously described, PC 7 sends a series of three 8-bit data bytes as serial data to PC interface 5a of controller 5 in a command structure over RS-232 bus 14. The PC interface 5a includes a UART function for providing the RS-232 function. The first byte sent by PC 7 is either an I/O (system state registers 11a, USB logic registers 12a, I/O logic registers 13a, or trace register 50) or data RAM 4 address; the second byte is a command; and the third byte is a data value that together with the address byte and the command byte identifies and supports data read and write operations to either an I/O or data RAM 4 address location. The I/O and data RAM 4 command structure is outlined in Table A.

TABLE A

Command Structure

| Command Name | Address Byte | Command Byte (hex) | Data Byte x = don't care | Function |
|---|---|---|---|---|
| WRITE DATA BYTE | Data RAM 4 Address | 00 | DATA | Write the Data Byte to the location identified by the Address Byte. |
| | *I/O Address | 02 | DATA | |
| READ DATA BYTE | Data RAM 4 Address | 01 | XX | Read the data byte at the location identified by the address byte an transmit the byte read to PC 7. |
| | *I/O Address | 03 | XX | |

*I/O includes system state registers 11a, USB logic registers 12a, I/O logic registers 13a, and trace register 50.

Trace register 50 of system bus logic 15 has two status bits (see FIG. 2) that can be read or written to by using the previously mentioned command structure, control of the USB microcontroller development system 100 can be facilitated by either PC 7 or dual ROM microprogrammable microprocessor 9 which have access to data RAM 4, system state registers 11a, and trace register 50 via the command structure of Table A.

Figure 2:
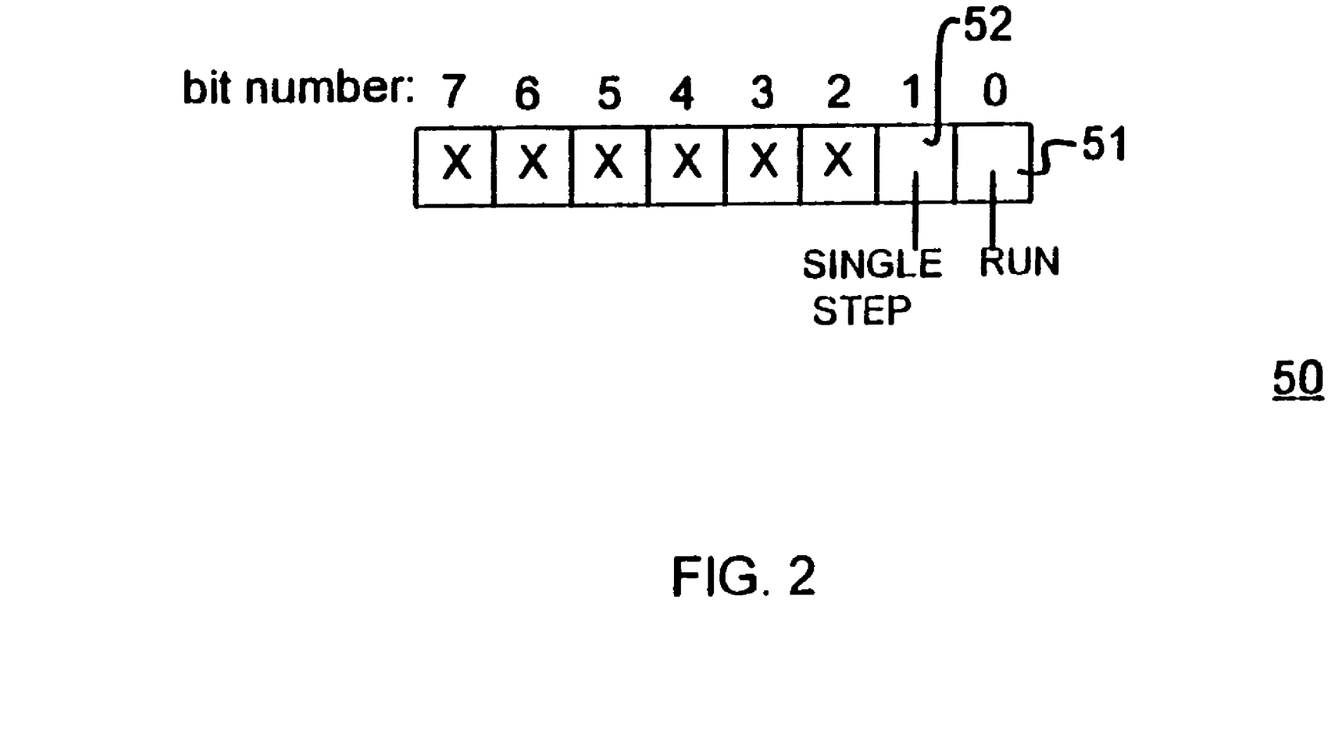
FIG. 2. is a bit-diagram of a trace register used on the USB microcontroller of FIG. 1.

FIG. 2. is a bit-diagram of a trace register 50 provided in system bus logic 15 to implement the above function. The contents of the trace register 50 can be modified by the dual ROM microprogrammable microprocessor 9 or the PC 7 via the command structure of Table A. RUN 51 (bit 0) of trace register 50, if set (bit 0=1), causes the dual ROM microprogrammable microprocessor 9 to execute instructions from instruction RAM 2, and if reset or cleared (bit 0=0), causes the dual ROM microprogrammable microprocessor 9 to stop executing instructions from instruction RAM 2. SINGLE STEP 52 (bit 1) of trace register 50, along with the RUN 51 control how many instructions from instruction RAM 2 dual ROM microprogrammable microprocessor 9 executes.

Figure 3:
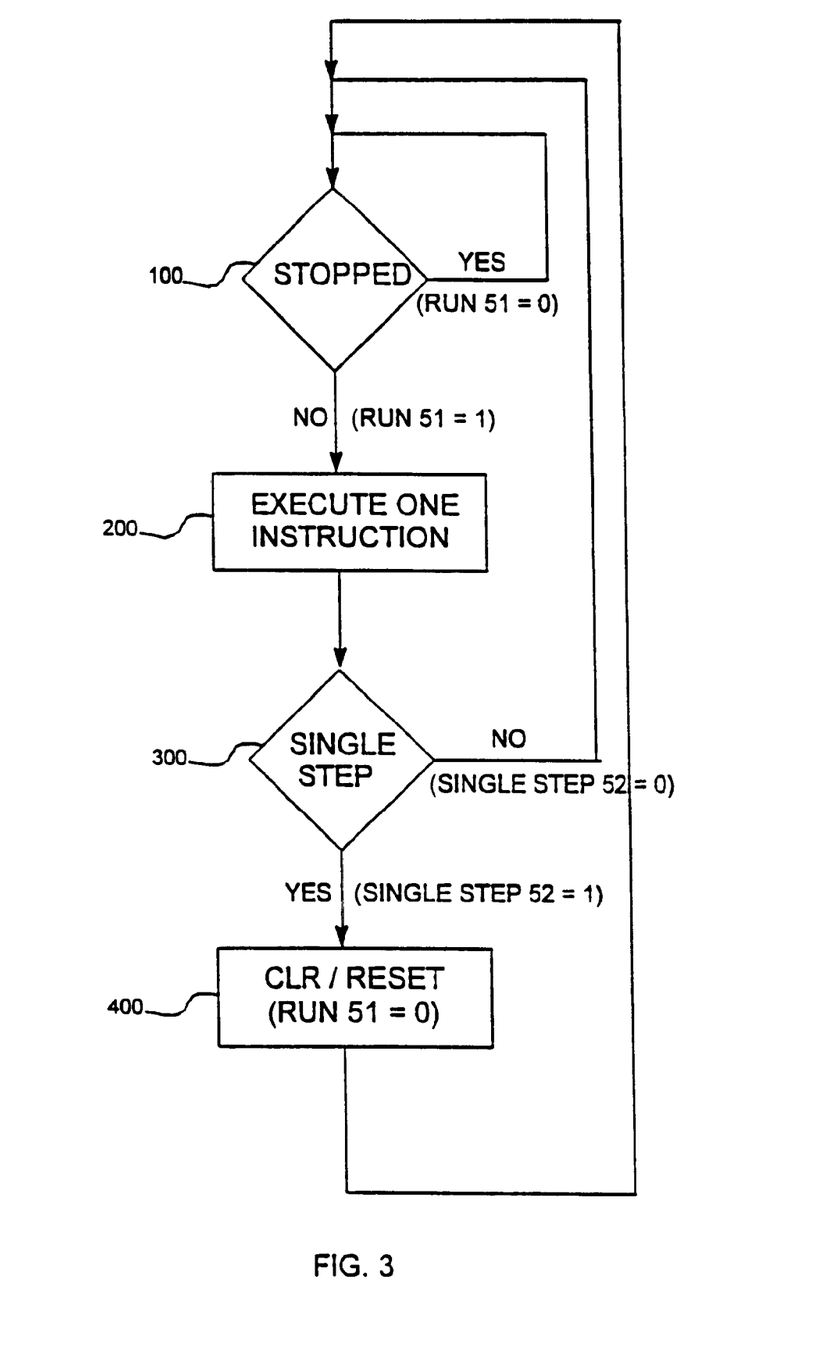
FIG. 3. is a logic flow diagram showing the run/single step operations of the USB microcontroller development system of FIG. 1.

FIG. 3. is a logic flow diagram showing the RUN/SINGLE STEP operations outlined above.

At step 100 the dual ROM microprogrammable microprocessor 9 is stopped (RUN 51=0). As long as RUN 51 is set to zero, by either the dual ROM microprogrammable microprocessor 9 or the controller 5, the microprocessor will not execute instructions in instruction RAM 2. However, if RUN 51 is set to one, by the controller 5, the logic flow goes to step 200.

At step 200 one instruction is executed by dual ROM microprogrammable microprocessor 9 from instruction RAM 2 and the logic flows to step 300.

At step 300 the contents of the SINGLE STEP 52 is checked. If SINGLE STEP 52 is set to zero (SINGLE STEP 52=0), by either the dual ROM microprogrammable microprocessor 9 or the controller 5, single step mode is not being selected and the logic flows back to step 100 where steps 100–300 are executed until either the dual ROM microprogrammable microprocessor 9 or the controller 5 sets RUN 51 to zero causing the dual ROM microprogrammable microprocessor 9 to stop executing instructions from instruction RAM 2. If SINGLE STEP 52 is set to one (SINGLE STEP 52=1), by either the dual ROM microprogrammable microprocessor 9 or the controller 5, single step mode is being selected and the logic flows to step 400.

At step 400 RUN 51 is set to zero, the logic flows to step 100, and the dual ROM microprogrammable microprocessor 9 is stopped at step 100 since RUN 51 was set to zero at step 400.

In this way, during single step mode only one instruction is executed at steps 100–400, the dual ROM microprogrammable microprocessor 9 is stopped at step 100 since RUN 51 is set to zero at step 400, and the PC 7 must issue an I/O write command to set RUN 51 to one at step 100 in order for dual ROM microprogrammable microprocessor 9 to execute the next instruction from instruction RAM 2. If single step mode is not set, then dual ROM microprogrammable microprocessor 9 continuously executes instructions from instruction RAM 2 until either the dual ROM microprogrammable microprocessor 9 itself or the PC 7 issues a write data byte command to clear RUN 51 to zero. At any time the PC 7 can modify/read the USB microcontroller system state, as described previously, to assist in debugging firmware stored in instruction RAM 2.

In addition, since PC 7 can write the system state registers 11a of dual ROM microprogrammable microprocessor 9, as described previously, which include the program counter 32 (FIG. 5) which is the address of the instruction RAM 2, an instruction register 24 (FIG. 5) which holds the data corresponding to the program counter 32, PC 7 can be used to load firmware into instruction RAM 2 for execution by dual ROM microprogrammable microprocessor 9.

The program counter 32 holds the address of instruction RAM 2 and instruction register 24 holds the data corresponding to the program counter 32. Thus, by PC 7 writing to the program counter 32 and the instruction register 24 and the sequencer logic 34 issuing a write command to instruction RAM 2, the entire contents of instruction RAM 2 may be written to by PC 7. Similarly, by writing an address to the program counter 32 and the sequencer logic 34 issuing a read command to instruction RAM 2, the entire contents of instruction RAM 2 may be read.

The interface to a USB host computer and USB device under development will now be described.

A USB host computer 16 is connected to USB interface 12b of USB logic 12 via USB 17. USB interface 12b complies with the USB standard. The USB logic 12 decodes addresses on the system bus 10, allowing dual ROM microprogrammable microprocessor 9 or controller 5 to read or write contents of the USB logic registers 12a via the command structure, as previously described.

Sensors, potentiometer, motors, LEDs, memories, data collecting or other input output devices of an I/O device 18 are connected to I/O interface 13b via I/O ports 19. The I/O logic 13 decodes addresses on the system bus 10, allowing dual ROM microprogrammable microprocessor 9 or controller 5 to read or write contents of the I/O logic registers 13a via the command structure, as previously described.

As an example, the USB microcontroller development system 100 could be used to debug firmware for a USB mouse or joystick, etc. In this case, the mouse or joystick sensors, potentiometer, etc. would be attached to I/O interface 13b via I/O ports 19, and the USB host computer 16 would be attached to USB interface 12b via USB 17. The firmware could be loaded from PC 7 to instruction RAM 2 by writing to the system state registers 11a and then debugged using the trace register 50 function and the ability to read/modify the microcontroller system state, as previously described. In this way, the USB mouse or joystick function etc. could implemented to run on USB host computer 16 via the USB microcontroller development system 100.

The present invention may be implemented via a Hardware Description Language, as previously described.

As an example, the writing operation of the system state registers 11a can be implemented in HDL with statements such as:

```
always @(posedge REGW)
begin
   case(LA)
   'rA: a=DI;
   'rT1: t1=DI;
   'rT2: t2=DI;
   'rDSP: dsp=DI;
   'rPSP: psp=DI;
   'rPCL: pcl=DI;
   endcase
end
``` and mapping of the system state registers 11a can be implemented in HDL with statements such as:

```
always @(LA or a or t1 or t2 or ID or IR or dsp or psp or pcl or pch)
begin
   #5;
   case(LA)
   'rA: LD=a;
   'rT1: LD=t1;
   'rT2: LD=t2;
   'rDSP: LD=dsp;
   'rPSP: LD=psp;
   'rPCL: LD=pcl;
   'rPCH: LD=pch;
   'rID: LD=ID;
   endcase
end
``` and HDL statements such as:

```
assign #1 regSelect=(DA[7:3]==5'b1110);
assign #1 idSelect=(DA[7:3]==5'b1111);
``` implement the address decode for the system state registers 11a and data RAM 4.

In the present invention, HDL implemented processes are used in designing various components of the USB microcontroller 8 to achieve the various objects of the invention. The various components of the USB microcontroller 8, when appropriately programmed in HDL, are mapped to FPGAs and packaged onto a single printed circuit board along with minimal additional logic such as EEPROMs and RAM.

Although in the preferred embodiment the USB microcontroller 8 includes several FPGAS, RAM and EEPROMs packaged onto a circuit board, this invention may be implemented using a conventional general purpose digital computer or microprocessor programmed according to the teachings of the present specification, as will be apparent to those skilled in the computer art. Appropriate software coding can readily be prepared by skilled programmers based on the teachings of the present disclosure, as will be apparent to those skilled in the software art. The invention may also be implemented by the preparation of application specific integrated circuits or by interconnecting an appropriate network of conventional component circuits, as will be readily apparent to those skilled in the art.

Although the preferred embodiment of the USB microcontroller development system 100 is described in terms of a USB development system, the present invention could be adapted for other device standards such as Newbus, PCI, VESA, etc. by simply modifying the USB logic 12 and I/O logic 13 functional blocks, as will be apparent to those skilled in the art.

Although the preferred embodiment of the USB microcontroller development system 100 is described in terms of providing a PC interface via an RS-232 bus, the present invention could be adapted to interface to various types of personal computers, workstations, etc. by simply modifying controller 5 functional block to include the appropriate interface, as will be apparent to those skilled in the computer art.

Although the preferred embodiment of the USB microcontroller development system 100 is described in terms of providing an external computer PC 7 and a USB host computer 16, the external computer PC 7 could also function as the USB host computer 16, as will be apparent to those skilled in the computer art.

Although the preferred embodiment of the USB microcontroller 8 is described in terms of providing a PC interface 5a and an instruction RAM 2, in a delivered system the USB microcontroller 8 would not include the PC interface 5a and the instruction RAM 2 would be replaced by a Read Only Memory ("ROM") device, as will be apparent to those skilled in the computer art.

The present invention includes a computer program product (developer access device 7a of PC 7) which may be on a storage medium including instructions which can be used to program PC 7 to perform a process of the invention. The storage medium can include, but is not limited to, any type of disk including floppy disks, optical discs, CD-ROMs, and magneto-optical disks, ROMs, RAMs, EPROMs, EEPROMs, magnetic or optical cards, or any type of media suitable for storing electronic instructions.

Obviously, numerous modifications and variations of each embodiment of the present invention are possible in light of the above teachings. It is therefore to be understood that within the scope of the appended claims, the invention may be practiced otherwise than as specifically described herein.

What is claimed is:

1. A microcontroller comprising:
    a microprocessor configured to transfer address, data and control signals over a system bus and execute one or more microprogram instructions in response to said address, data and control signals;
    a memory device (i) coupled to said microprocessor, (ii) mapped to said system bus, and (iii) configured to store said microprogram instructions for execution by said microprocessor;
    a host interface configured to interface to a host computer;
    an I/O interface configured to interface to at least one I/O device; and
    a controller configured to receive and transfer (i) commands from an external computer and (ii) said address, data and control signals to said microprocessor, said host interface and said I/O interface through said system bus, wherein said external computer is configured to read and control a state of said microcontroller in response to said commands.

2. The microcontroller according to claim 1, wherein said microprocessor comprises (i) one or more system state registers mapped to said system bus and (ii) a trace register mapped to said system bus and configured to enable said microprocessor to selectively execute one or a sequence of said microprogram instructions.

3. The microcontroller according to claim 1, wherein said controller further comprises a computer interface coupled to said system bus and configured to transfer said commands from said external computer to said controller, said commands used by said controller to generate said address, data and control signals to control said microprocessor.

4. The microcontroller according to claim 1, wherein said host computer and/or said at least one I/O device comprises a Universal Serial Bus (USB) device.

5. The microcontroller according to claim 2, wherein said microprocessor or said host computer coupled to said host interface controls said microcontroller in response to the contents of said one or more state registers.

6. The microcontroller according to claim 2, wherein said trace register is configured to be accessed by said controller and said microprocessor.

7. A microcontroller comprising:
a microprocessor configured to transfer address, data and control signals over a system bus and execute one or more microprogram instructions in response to said address, data and control signals;
a first ROM configured to store a plurality of microprogram subroutine starting address sets and a second ROM configured to store a plurality of subroutines, wherein each of said subroutines contains a series of said microprogram instructions;
a host interface configured to interface to a host computer;
an I/O interface configured to interface to at least one I/O device; and
a controller configured to receive and transfer (i) commands from an external computer and (ii) said address, data and control signals to said microprocessor, said host interface and said I/O interface through said system bus, wherein said external computer is configured to read and control a state of said microcontroller in response to said commands.

8. The microcontroller according to claim 7, wherein said microcontroller further comprises:
a third memory device (i) coupled to said microprocessor, (ii) mapped to said system bus, and (iii) configured to store said microprogram instructions for execution by said microprocessor; and
a fourth memory device (i) mapped to said system bus and (ii) configured to store said address and said data signals.

9. The microcontroller according to claim 7, wherein said microprocessor comprises (i) one or more system state registers mapped to said system bus and (ii) a trace register mapped to said system bus and configured to enable said microprocessor to selectively execute one or a sequence of said microprogram instructions.

10. The microcontroller according to claim 7, wherein said controller further comprises a computer interface coupled to said system bus and configured to transfer said commands from said external computer to said controller, said commands used by said controller to generate said address, said data and said control signals to control said microprocessor.

11. The microcontroller according to claim 7, wherein said host computer and/or said at least one I/O device comprises a Universal Serial Bus (USB) device.

12. The microcontroller according to claim 9, wherein said microprocessor or said host computer coupled to said host interface controls said microcontroller in response to the contents of said one or more state registers.

13. The microcontroller according to claim 9, wherein said trace register is configured to be accessed by said controller and said microprocessor.

14. A microcontroller development system comprising:
a microprocessor configured to transfer address, data and control signals over a system bus and execute one or more microprogram instructions in response to said address, data and control signals;
a first ROM configured to store a plurality of microprogram subroutine starting address sets and a second ROM configured to store a plurality of subroutines, wherein each of said subroutines contains a series of said microprogram instructions;
a host interface configured to interface to a host computer;
an I/O interface configured to interface to at least one I/O device; and
a controller configured to receive and transfer (i) commands from an external computer and (ii) said address, data and control signals to said microprocessor, said host interface and said I/O interface through said system bus, wherein said external computer is configured to read and control a state of said microcontroller in response to said commands.

15. The microcontroller development system according to claim 14, wherein said microcontroller further comprises:
a third memory device (i) coupled to said microprocessor, (ii) mapped to said system bus, and (iii) configured to store said microprogram instructions for execution by said microprocessor; and
a fourth memory device (i) mapped to said system bus and (ii) configured to store said address and said data signals.

16. The microcontroller according to claim 14, wherein said microprocessor comprises (i) one or more system state registers mapped to said system bus and (ii) a trace register mapped to said system bus and configured to enable said microprocessor to selectively execute one or a sequence of said microprogram instructions.

17. The microcontroller according to claim 14, wherein said controller further comprises a computer interface coupled to said system bus and configured to transfer said commands from said external computer to said controller, said commands used by said controller to generate said address, said data and said control signals to control said microprocessor.

18. The microcontroller development system according to claim 14, wherein said host computer and/or said at least one I/O device comprises a Universal Serial Bus (USB) device.

19. The microcontroller according to claim 16, wherein said microprocessor or said host computer coupled to said host interface controls said microcontroller in response to the contents of said one or more state registers.

20. The microcontroller according to claim 16, wherein said trace register is configured to be accessed by said controller and said microprocessor.

* * * * *